United States Patent [19]

Niitu et al.

[11] 3,784,031
[45] Jan. 8, 1974

[54] MACHINE FOR PERFORMING WORK
[75] Inventors: Moritada Niitu, Kawasaki; Toshio Ide, Tokyo, both of Japan
[73] Assignee: Tokyo Shibaura Electric Company, Ltd., Kawasaki-shi, Japan
[22] Filed: Sept. 23, 1971
[21] Appl. No.: 183,141

[30] Foreign Application Priority Data
Sept. 25, 1970 Japan.................................. 45/83371

[52] U.S. Cl........... 214/1 BC, 214/1 BD, 214/1 CM
[51] Int. Cl............................................... B63c 8/00
[58] Field of Search............. 214/1 CM, 1 BD, 1 BC

[56] References Cited
UNITED STATES PATENTS
R25,889  10/1965  Willsea............................. 214/1 BC
3,306,471  2/1967  Devol............................... 214/1 BC
3,451,224  6/1969  Colechia........................... 214/1 CM

*Primary Examiner*—Robert G. Sheridan
*Assistant Examiner*—George F. Abraham
*Attorney*—Norman F. Oblin et al.

[57] ABSTRACT

In a machine for performing work characterized by a manipulator arm having a working hand rotatably carried in a frame rotatably mounted in a support and gear train means for rotating the hand, the frame and the support to permit bending and swivelling motions of the hand. A transmission gearing arrangement is provided between the frame rotating means and the hand rotating means to prevent rotating the hand through rotating the frame, and another transmission gearing arrangement connects the support rotating means and the frame rotating means for preventing rotating the frame and the hand through rotating the support, whereby undesirable bending and swivelling of the hand are eliminated.

5 Claims, 2 Drawing Figures

PATENTED JAN 8 1974

3,784,031

INVENTORS
MORITADA NIITU
TOSHIO IDE

BY Oblon, Fisher & Spivak

ATTORNEYS

MACHINE FOR PERFORMING WORK

BACKGROUND OF THE INVENTION

1. Field of the Invention

This invention relates generally to a machine for performing work and more particularly to an improved mechanical manipulator for handling objects, performing spot welding, painting and the like in a repetitive manner.

2. Description of the Prior Art

In nearly all modern industries, automatic machines, such as numerical control machines, machining centers and the like, have been developed in an effort to decrease human labor requirements. One of the most desired of such machines is that which has come to be known as the "industrial robot," which is capable of performing the complicated manipulatory exercises of the human hand in a similar manner of functional maneuverability. Considering the function of the human hand, including the fingers thereof, these manipulatory exercises include turning and bending the wrist and gripping with the fingers. A working head or "hand" of an automatic mechanical manipulator, therefore, which is given three degrees of freedom consisting of a swivelling, or turning operation, bending and the capability of gripping, can perform many simple repetitive jobs while being unattended by operators.

In handling operations, for example, abutting surfaces of the fingers of the mechanical manipulator, or machine, should be positioned in parallel relation with the abutting surfaces of an object to be handled. However, the surfaces of the object being manipulated often may be directed in various directions. Accordingly, there are some cases where the working head of such a machine having these three degrees of freedom still cannot adequately handle the object. Therefore, it is desirable to further increase the freedom of the working hand in such manipulators or machines.

In some prior art machines of the character described above, these three actions have been carried out by means of two drive shafts and one hydraulic driving arrangement, the two drive shafts being used respectively for the swivelling and bending operations of the working head and the one hydraulic driving arrangement being used for the gripping operation thereof. A disadvantage of such conventional machines is that the bending operation of the working head caused by one of the drive shafts is also accompanied by unnecessary swivelling of that working head.

SUMMARY OF THE INVENTION

It is one object of the present invention, therefore, to provide an improved machine for performing work characterized by a mechanical manipulator having a working head with increased freedom of maneuverability.

Another object of this invention is to provide an improved machine for performing work characterized by a mechanical manipulator having arrangements for eliminating unnecessary rotation, or swivelling motion, of the working head which usually accompanies bending operations of the same.

Briefly stated, in accordance with one aspect of the present invention, the foregoing and other objects are attained through the provision of a machine for performing work having a base member with an arm member mounted thereon and a mechanical manipulator in the form of a working hand secured to an end of the arm member. A first supporting means for the hand is rotatable in a plane perpendicular to a longitudinal extension of the arm and a second supporting means is provided for the hand being rotatably mounted in the first supporting means for producing bending motion in a plane perpendicular to the rotational plane of the first supporting means. Means also are provided for rotating the hand within the second supporting means in a plane parallel to the rotational plane of the first supporting means, whereby swivelling motion is produced. A train of intermeshed gears provide for the desired rotations of the various supporting means and also prevent undesirable rotational motions being introduced when only one type motion is wanted but the same is likely under ordinary conditions to produce other motion. Thus, intermediate gearing means are operative to counter-act the revolution of the gearing for the various supporting means of the hand during certain bending and swivelling-producing operations.

BRIEF DESCRIPTION OF THE DRAWINGS

Various other objects, features and attendant advantages of this invention will be more fully appreciated as the same becomes better understood from the following detailed description when considered in connection with the accompanying drawings, wherein like reference numerals designate like or corresponding parts throughout the several views, and in which.

DETAILED DESCRIPTION OF A PREFERRED EMBODIMENT

Figure 1:
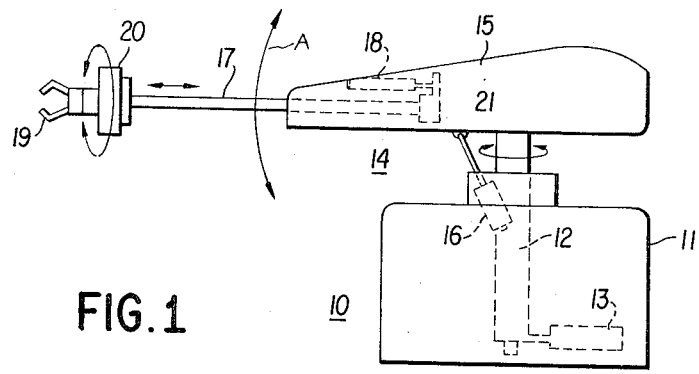
FIG. 1 shows a schematical side view of one embodiment of a manipulator constructed according to the present ivention.

Referring now to the drawings, and more particularly to FIG. 1, a machine which is generally designated by reference numeral 10 has a stationary base member 11 housing various working mechanisms and the motive power sources therefor. Projecting vertically through the top of the base member 11 is a turnable column 12 which can be turned about a vertical axis by a suitable mechanism, such as a hydraulic servo system 13. Supported by the column 12 is an arm member generally designated by the numeral 14 having a turret portion 15 rotatably mounted on the column 12 around a horizontal axis. Between the turret 15 and the base member 11 a mechanism, such as a hydraulic servo system 16, is provided for moving the free end of the arm 14 up and down, as indicated by the arrow A. The arm 14 also comprises a slidable arm portion 17 mounted on the turret portion 15 and being slidable in a reciprocable path along its longitudinal axis by a suitable mechanism, such as a hydraulic servo system 18. The slidable arm portion 17 supports on one end thereof a hand portion 19 and a hand operating mechanism 20 for providing the desired actions of swivelling, bending, and gripping of a manipulative hand, along with a driving mechanism 21 for the hand operating mechanism 20, which comprises a set of three cylindrical connecting members 22, 23, and 24, shown in FIG. 2.

Figure 2:
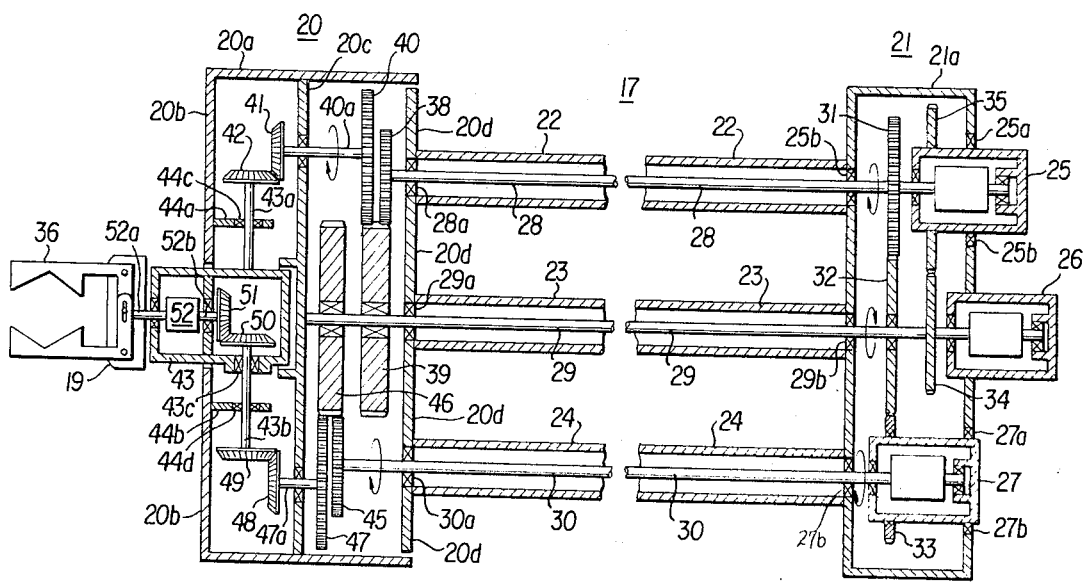
FIG. 2 is a sectional plan view of the principal portion of the embodiment shown in FIG. 1.

In FIG. 2, a detailed construction is shown of the free end of the slidable arm portion 17, illustrating that the driving mechanism 21 has a casing 21a to which the connecting members 22, 23 and 24 are fixedly mounted. Rotary torque actuators 25, 26 and 27 are so constructed that when energized, the shafts thereof are rotated according to the given energizing signal, while when not energized, the shafts thereof are locked. The actuators 25 and 27 are rotatably mounted in the casing 21a by suitable bearing devices 25a, 25b and 27a, 27b, respectively, while the actuator 26 is fixedly mounted in the casing. Operating shafts 28, 29 and 30 are provided within the connecting members 22, 23 and 24, being connected to the shafts of the actuators 25, 26 and 27, respectively. Fixedly mounted on the shaft 28 is a gear 31 meshing with a gear 32 rotatably mounted on the shaft 29, which in turn meshes with a gear fixedly mounted on the actuator 27. Another gear 34 fixedly mounted on the shaft 29 between the gear 32 and the actuator 26 operatively engages a gear 35 fixedly mounted on the actuator 25.

The hand operating mechanism 20 includes a casing having a cylindrical wall portion 20a, an end wall 20b of disc-shape fixedly secured to wall 20a and having a central bore, and a middle wall 20c also being disc-shaped and fixedly secured to wall 20a. The middle wall 20c is also fixedly connected to the left hand end of the shaft 29 whereby it is rotatable therewith. There is further provided an end wall 20d opposite end wall 20b and also of disc shape, with a clearance provided with respect to the cylindrical wall 20a, being fixedly connected to the connecting members 22, 23 and 24.

The shaft 28, which is rotatably supported adjacent opposite ends thereof by suitable bearings 28a and 25b, acts as an operating shaft for bending the hand portion 19, including a pair of fingers 36, upwardly and downwardly. Secured to the left end of the shaft 28 is a gear 38 meshing with a gear 39 rotatably mounted on the shaft 29 in connecting member 23, which in turn meshes with a gear 40. The gear 40 is secured to the right end of a shaft 40a which is rotatably supported by the middle wall 20c. Fixedly mounted on the left end of the shaft 40a is a bevel gear 41 operatively engaging another bevel gear 42 fixedly mounted on a supporting shaft 43a of a frame member 43, which also has a supporting shaft 43b on an opposite side extending in alignment with the supporting shaft 43a and being rotatably mounted on the frame member 43 by a suitable bearing 43c, as shown. These supporting shafts 43a and 43b are rotatably mounted on support arms 44 a and 44b, respectively, which are fixed on the end wall 20b, through suitable bearings 44c and 44d, respectively. Thus the frame 43 which supports a hand portion 19 may be rotated around the common axis of the shaft 43a and 43b in response to rotation of the gear 42, and in this manner, the bending action of the hand portion 19 is obtained.

Shaft 29 is rotatably supported by bearings 29a and 29b, and the left end of the shaft 29 is secured to the middle wall 20c. Thus, when the shaft 29 is rotated, the middle wall 20c, cylindrical portion 20a and the end wall 20b, which supports the frame 43, are all rotated therewith.

Secured to the left end of the shaft 30 being rotatably supported by suitable bearings 30a and 27b is a gear 45 meshing with a gear 46 rotatably supported on the shaft 29. The gear 46 operatively engages a gear 47 which is fixedly mounted on a shaft 47a rotatably supported on the middle wall 20c, as shown. At the left end of the shaft 47a there is provided a bevel gear 48 meshing with another bevel gear 49 which is secured to the supporting shaft 43b of the frame 43. The supporting shaft 43b extends within the frame 43 and has a bevel gear 50 secured thereto meshing with a bevel gear 51.

In order to operate the fingers 36 of the hand 19, there is provided an actuator 52 positioned within the frame 43 and having a pair of aligned rods 52a and 52b extending from opposite sides thereof. The rods 52a and 52b are rotatably supported in the frame 43 in alignment with the operating shaft 29 by suitable bearings, as shown. Secured to the right end of the rod 52b is the bevel gear 51 meshing with the bevel gear 50. Mounted on the left end of the rod 52a is the hand portion 19 of the manipulator having fingers 36. The rod 52a is the operating rod of the actuator 52 and is moved toward the left and right in response to given signals to cause the fingers 36 to close for gripping and open for releasing an object. On the other hand, rotation of the bevel gear 51, or of the rod 52b, is transmitted to the rod 52a, whereby the hand portion 19 is rotated or swivelled. Details of these swivelling portions are disclosed in the copending application Ser. No. 116,061, filed Feb. 17, 1971, of Hisao Totsuka, which is assigned to the same assignee as this application.

In operation, selective positioning of the hand portion 19 in the present invention can be obtained by the combined operation of turning the column 12 through the hydraulic system 13, upwardly and downwardly moving the arm 14 through the hydraulic system 16, and sliding the slidable arm portion 17 through the hydraulic system 18.

When the actuator 25 is energized to cause the shaft 28 to rotate, the frame 43 is rotated about the common axis of the supporting shafts 43a and 43b through the gears 38, 39 and 40 and the bevel gears 41 and 42, whereby bending motion of the hand 19 is obtained. Operation of the actuator 27 causes the hand portion 19 to swivel, or rotate, through the shaft 30, the gears 45, 46 and 47 and the bevel gears 48, 49, 50 and 51.

In the bending operation of the hand 19, if the bevel gear 50 is kept stationary during rotation of the shaft 43a, the rotation of the frame 43 through an up and down path causes the bevel gear 51 in mesh therewith to rotate, thereby causing the hand to swivel. However, according to this embodiment, rotation of the gear 31 fixedly mounted on the shaft 28 also is imparted through the gears 32 and 33, the shaft 30, the gears 45, 46 and 47, the shaft 47a, the bevel gears 48 and 49, and the shaft 43b to the gear 50 to cancel the above described undesirable swivelling motion occuring during the bending operation. In other words, the rotation of the shaft 28 causes the supporting shafts 43a and 43b of the frame 43 to rotate in unison.

On the other hand, if only a swivelling motion is desired, the actuator 26 is energized to cause the shaft 29 to rotate, so that the rotatable portion of the hand operating portion 20 is rotated, while the rotation of the gear 34 is transmitted through gear 35, the shaft 28 and the gear 38, to the gear 39 as well as through the gears 35, 31, 32 and 33, the shaft 30 and the gears 45 and 46 whereby the gears 39 and 46 are rotated in unison with the middle wall 20c. Thus, the gears 40 and 47 are not rotated, that is, any unnecessary or undesirable motion of bending and swivelling of frame 43 alone is prevented from occurring.

According to this embodiment, the hand operating mechanism 20 can be provided with a portion rotatable about the axis of the shaft 29 for supporting the frame 43 by means of a gearing arrangement including the gears 39 and 46, being rotatably mounted on the shaft 29, through which two kinds of motion for causing bending and swivelling operations can be transmitted. Thus, the desired rotation of the frame 43 in the plane perpendicular to the shaft 29 can be obtained and the freedom of action of the hand portion is increased.

Further, the provision of transmission gears, including gears 31, 32, 33, 34 and 35, effectively prevents unnecessary swivelling and bending motions.

Obviously many modifications and variations of the present invention are possible in light of the above tecahings. It is to be understood, therefore, that within the scope of the appended claims, the invention may be practiced otherwise than as specifically described herein.

What is claimed as new and desired to be secured by letters patent of the United States is:

1. A machine for performing work comprising:
   a base member;
   an arm member retractably mounted on and extending from said base member;
   first supporting means for a vorking hand rotatably mounted on a free end of said arm member in a first plane substantially perpendicular to the longitudinally extending arm member;
   second supporting means rotatably mounted on said first supporting means for rotatation in a second plane perpendicular to said first plane for producing a bending action with said hand;
   hand means mounted on said second supporting means rotatable in a third plane parallel to the rotating axis of said second supporting means and having a finger arrangement thereon capable of performing a gripping operation;
   means for rotating said first supporting means;
   first gearing means for rotating said second supporting means;
   second gearing means for rotating said hand means; and a transmission means connecting said first and second gearing means to prevent undesirable rotating motion of said hand means when said first supporting means is being rotated.

2. A machine for performing work according to claim 1, further comprising:
   another transmission means connecting said means for rotating the first support means and first gearing means to prevent undesirable rotating motion of said second supporting means and said hand means when the hand is being rotated by the second gearing means.

3. A machine for performing work according to claim 1, further comprising:
   a first rotary actuator;
   the means for rotating the first supporting means consisting of a first drive shaft connecting said first rotary actuator and said first supporting means;
   a second rotary actuator;
   a second drive shaft connecting said second rotary actuator and said first gearing means;
   a third actuator;
   a third drive shaft connecting said third actuator and said second gearing means; and
   said means for rotating the first supporting means connecting said first drive shaft and said first gearing means through said second rotary actuator to prevent undesirable rotary motion of said second supporting means and said hand means during rotation of the first supporting means.

4. A machine for performing work comprising:
   a base member;
   an arm member retractably mounted on and extending from said base member;
   first supporting means for a working hand rotatably mounted on a free end of said arm member in a first plane substantially perpendicular to the longitudinally extending arm member;
   second supporting means rotatably mounted on said first supporting means for rotation in a second plane perpendicular to said first plane for producing a bending action with said hand;
   hand means mounted on said second supporting means rotatable in a third plane parallel to the rotating axis of said second supporting means and having a finger arrangement thereon capable of performing a gripping operation;
   means for rotating said first supporting means;
   first gearing means for rotating said second supporting means;
   second gearing means for rotating said hand means; and
   wherein said first supporting means is a substantially cylindrical-shaped casing housing said first and second gearing means.

5. A machine for performing work comprising:
   a base member;
   an arm member extending from said base member;
   first support means mounted on one end of said arm member and rotatable about a given axis;
   second support means rotatably mounted on said first support means for rotation in a plane parallel to said given axis;
   a mechanical hand mounted on said second support means for rotation about an axis aligned with said given axis;
   means for rotating said first support means;
   first gearing means for rotating said second support means;
   second gearing means for rotating said mechanical hand;
   first transmission means connecting said first gearing means and said second gearing means for operating the same in unison to prevent said mechanical hand being undesirably rotated through said second gearing means when operating said gearing means for rotating said second support means only; and,
   second transmission means connecting said means for rotating said first support means and said first transmission means for preventing said second support means and said mechanical hand being undesirably rotated through said first gearing means and said second gearing means when operating said means for rotating said first support means only.

* * * * *